(12) United States Patent
Zhang et al.

(10) Patent No.: US 12,524,160 B2
(45) Date of Patent: Jan. 13, 2026

(54) METHOD AND APPARATUS FOR ALLOCATING DATA STORAGE SPACE

(71) Applicant: Huawei Technologies Co., Ltd., Shenzhen (CN)

(72) Inventors: Rui Zhang, Shenzhen (CN); Lin Han, Shenzhen (CN); Xing Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/650,866

(22) Filed: Apr. 30, 2024

(65) Prior Publication Data

US 2024/0281146 A1 Aug. 22, 2024

Related U.S. Application Data

(63) Continuation of application No. PCT/CN2022/091668, filed on May 9, 2022.

(30) Foreign Application Priority Data

Nov. 3, 2021 (CN) .......................... 202111294006.0

(51) Int. Cl.
G06F 3/06 (2006.01)
(52) U.S. Cl.
CPC .......... *G06F 3/0617* (2013.01); *G06F 3/0631* (2013.01); *G06F 3/0673* (2013.01)
(58) Field of Classification Search
CPC ........ G06F 3/0617; G06F 3/0631; G06F 3/06; G06F 3/0673
See application file for complete search history.

(56) References Cited

U.S. PATENT DOCUMENTS 5,493,676 A * 2/1996 Amundson ......... G06F 11/3058
714/6.32
6,449,731 B1 * 9/2002 Frey, Jr. .................. G06F 16/10
714/6.24
(Continued)

FOREIGN PATENT DOCUMENTS

CN 102419734 A 4/2012
CN 105607726 A 5/2015
(Continued)

OTHER PUBLICATIONS

Hwa Min Lee et al., "A resource manager for optimal resource selection and fault tolerance service in Grids," IEEE International Symposium on Cluster Computing and the Grid, 2004. CCGrid 2004., Chicago, IL, USA, 2004, pp. 572-579.*
(Continued)

*Primary Examiner* — Pierre Michel Bataille
(74) *Attorney, Agent, or Firm* — Conley Rose, P.C.

(57) ABSTRACT

A method for allocating a data storage space includes detecting one allocation request of an operating system for a continuous storage space for a target program; extracting a feature of the allocation request; determining, based on the feature of the allocation request, a fault tolerance requirement corresponding to the allocation request; and allocating a storage space of a corresponding fault tolerance level to the allocation request based on the fault tolerance requirement corresponding to the allocation request.

19 Claims, 4 Drawing Sheets

(56) References Cited

U.S. PATENT DOCUMENTS

| | | | |
|---|---|---|---|
| 6,467,058 B1* | 10/2002 | Chakradhar | G01R 31/318335 714/745 |
| 7,814,272 B2* | 10/2010 | Barrall | G06F 11/1096 711/114 |
| 8,578,127 B2* | 11/2013 | Thatcher | G06F 12/0292 711/202 |
| 8,949,653 B1* | 2/2015 | Kayan | G06F 11/202 714/1 |
| 11,372,686 B1* | 6/2022 | Vig | G06F 9/5072 |
| 11,799,901 B2* | 10/2023 | Bansal | H04L 63/0227 |
| 11,868,612 B1* | 1/2024 | Foley | G06F 3/0604 |
| 11,995,322 B2* | 5/2024 | Dong | G06F 3/0659 |
| 2005/0010722 A1 | 1/2005 | Chen | |
| 2006/0253674 A1* | 11/2006 | Zohar | G06F 11/0793 711/165 |
| 2016/0019115 A1* | 1/2016 | Shuster | G06F 11/1096 714/770 |
| 2017/0153939 A1 | 6/2017 | Govindan et al. | |
| 2020/0004650 A1* | 1/2020 | Hanko | G06F 3/0631 |
| 2020/0125463 A1* | 4/2020 | Mestar | G06F 11/2048 |
| 2021/0081366 A1* | 3/2021 | Madisetti | G06F 40/289 |
| 2023/0300000 A1* | 9/2023 | Poustchi | H04L 12/4015 370/431 |
| 2024/0231653 A1* | 7/2024 | Chen | G06F 3/0631 |

FOREIGN PATENT DOCUMENTS

| | | | | |
|---|---|---|---|---|
| CN | 112667443 A | | 4/2021 | |
| WO | WO-2020131664 A1 | * | 6/2020 | .......... G06F 21/552 |

OTHER PUBLICATIONS

S. Paul, N. Chatterjee and P. Ghosal, "A Dynamic Resource Allocation Strategy for NoC Based Multicore Systems with Permanent Faults," 2018 IEEE Computer Society Annual Symposium on VLSI (ISVLSI), Hong Kong, China, 2018, pp. 287-292.*

E. W. Wächter, V. Fochi, F. Barreto, A. M. Amory and F. G. Moraes, "A Hierarchical and Distributed Fault Tolerant Proposal for NoC-Based MPSoCs," in IEEE Transactions on Emerging Topics in Computing, vol. 6, No. 4, pp. 524-537, Oct. 1-Dec. 2018.*

Deqing Zou, H. Jin, Song Wu and Jianhua Sun, "RT-GRID: a real-time, fault-tolerant grid model," Proceedings of the Fourth International Conference on Parallel and Distributed Computing, Applications and Technologies, Chengdu, China, 2003, pp. 634-639.*

A. Biswas, et al., "Computing architectural vulnerability factors for address-based structures," 32nd International Symposium on Computer Architecture (ISCA 05), Madison, WI, USA, Jun. 4-8, 2005, pp. 532-543.

* cited by examiner

METHOD AND APPARATUS FOR ALLOCATING DATA STORAGE SPACE

CROSS-REFERENCE TO RELATED APPLICATIONS

This is a continuation of International Patent Application No. PCT/CN2022/091668 filed on May 9, 2022, which claims priority to Chinese Patent Application No. 202111294006.0 filed on Nov. 3, 2021. The disclosures of the aforementioned applications are hereby incorporated by reference in their entireties.

TECHNICAL FIELD

This application relates to the field of storage technologies, and in particular, to a method and apparatus for allocating a data storage space.

BACKGROUND

Faults may occur in a running process of computer hardware. These faults are usually caused by hardware design or manufacturing disadvantages or impact of external environment factors (such as a high temperature, vibration, and high-energy cosmic particles). The hardware faults may cause errors and failures in software and hardware systems. For example, in a memory system, a hardware fault occurring in a storage medium such as a random-access memory (RAM) may cause a memory bit flipping error such as, for example, a value of a memory bit changes from 0 to 1, or from 1 to 0. The memory bit flipping error may cause a program running failure. For example, a program generates a wrong result or throws an exception, or the program (or even an operating system) is suspended.

Therefore, most modern computer systems implement some fault tolerance mechanisms to ensure that the systems can detect and even rectify errors when the errors occur, to reduce or even eliminate impact of the errors. Common fault tolerance mechanisms are usually based on an idea of "redundancy". In an example, an error detection and rectification capability is provided by using additionally provided storage or computing resources. Correspondingly, fault tolerance also causes space costs (for example, occupation of a memory or storage space) or time costs (for example, causing performance overheads).

A fault tolerance mechanism in an existing computer system in the industry is fixed and implemented as a static mechanism. That is, once the fault tolerance mechanism is designed and implemented, the fault tolerance mechanism is in an unchanged state in the system. Further, in the memory system, an on-die error correction code (ECC) fault tolerance mechanism is a current mainstream fault tolerance mechanism. In this mechanism, an 8-bit ECC is additionally added to 64-bit data to implement a fault tolerance capability of single-bit error correction and double-bit error detection (SECDED), that is, SECDED for the 64-bit data. In addition, a system that has a higher requirement for a fault tolerance capability may use a memory mirroring mode. In this mode, 1:1 redundancy is required for a memory space. That is, half of the memory space is used for mirroring for fault tolerance.

As described above, fault tolerance usually causes space overheads or even time overheads. In addition to the foregoing space overheads, memory read/write performance decreases by 10% to 20% due to the on-die ECC, and memory read/write bandwidth decreases by 50% due to memory mirroring.

SUMMARY

The present disclosure provides a method and apparatus for allocating a data storage space, to allocate a storage space of a corresponding fault tolerance level to one allocation request for a continuous storage space for a target program based on different fault tolerance requirements of the allocation request for a continuous storage space for the target program, to dynamically allocate a fault tolerance resource on demand, and reduce unnecessary performance costs and cost overheads caused by fault tolerance.

According to a first aspect, the present disclosure provides a method for allocating a data storage space. The method may be applied to a computing device. The computing device includes a storage system having storage spaces of a plurality of fault tolerance levels, and storage spaces of different fault tolerance levels have different fault tolerance capabilities. The method includes detecting one allocation request of an operating system for a continuous storage space for a target program, extracting a feature of the allocation request, determining, based on the feature of the allocation request, a fault tolerance requirement corresponding to the allocation request, and allocating a storage space of a corresponding fault tolerance level to the allocation request based on the fault tolerance requirement corresponding to the allocation request. For ease of description, the allocation request for a continuous storage space for the target program is referred to as the allocation request for short in the following.

In an existing static fault tolerance mechanism, a storage system provides only a storage space of a fixed fault tolerance level, and a storage space of a fixed fault tolerance level is allocated to any allocation request for a storage space. To ensure normal running of the system, a storage space of a high fault tolerance level is definitely set, but for an allocation request for a storage space with a low fault tolerance requirement, unnecessary performance costs and cost overheads are caused. However, according to the method for allocating a data storage space provided in the first aspect, the storage space of the corresponding fault tolerance level is allocated to the allocation request for a continuous storage space for the target program based on different fault tolerance requirements of the allocation request for a continuous storage space for the target program, to dynamically allocate a fault tolerance resource on demand, and reduce unnecessary performance costs and cost overheads caused by fault tolerance.

In a possible implementation, the feature of the allocation request is determined based on one or more of the following: a size of the storage space corresponding to the allocation request, a frequency of accessing the storage space corresponding to the allocation request, and a location at which the storage space corresponding to the allocation request is invoked in a program.

In another possible implementation, determining, based on the feature of the allocation request, a fault tolerance requirement corresponding to the allocation request includes searching a pre-stored mapping table that stores a mapping relationship between a feature of an allocation request for a continuous storage space and a fault tolerance requirement, to determine the fault tolerance requirement corresponding to the allocation request.

In another possible implementation, the fault tolerance requirement corresponding to the allocation request is related to impact, on running of the target program, of a data loss of data that needs to be stored for the allocation request for a continuous storage space.

In another possible implementation, the fault tolerance requirement is related to a frequency of performing a write operation in a continuous storage space after corresponding data is stored into the continuous storage space for the allocation request, or the fault tolerance requirement is related to a frequency of performing a write operation in a continuous storage space after corresponding data is stored into the continuous storage space for a plurality of requests of a same type as the allocation request.

In another possible implementation, the impact on the running of the target program is related to the frequency of performing the write operation in the continuous storage space after the corresponding data is stored into the continuous storage space for the allocation request, or the impact on the running of the target program is related to the frequency of performing the write operation in the continuous storage space after the corresponding data is stored into the continuous storage space for the plurality of requests of the same type as the allocation request.

Therefore, the impact, on the running of the target program, of the data loss of the data may be determined based on the frequency of performing the write operation in the continuous storage space, and then the fault tolerance requirement of the allocation request is determined based on the impact, on the running of the target program, of the data loss of the data that needs to be stored for the allocation request for a continuous storage space.

In another possible implementation, the storage system is a memory of a computing device, the operating system is run on the computing device, and the storage spaces of the plurality of fault tolerance levels are memory spaces of the plurality of fault tolerance levels.

In another possible implementation, the allocation request carries a data segment related to the target program, and the data segment related to the target program includes code of the target program, data generated in a running process of the target program, or input data of the target program.

In another possible implementation, the storage spaces of different fault tolerance levels have different fault tolerance mechanisms, or the storage spaces of different fault tolerance levels have a same fault tolerance mechanism, but different fault tolerance capabilities.

According to a second aspect, the present disclosure provides an apparatus for allocating a data storage space. The apparatus is used in a computing device. The computing device includes a storage system, the storage system provides storage spaces of a plurality of fault tolerance levels, and storage spaces of different fault tolerance levels have different fault tolerance capabilities. The apparatus includes a detection module configured to detect one allocation request of an operating system for a continuous storage space for a target program, an extraction module configured to extract a feature of the allocation request, a determining module configured to determine, based on the feature of the allocation request, a fault tolerance requirement corresponding to the allocation request, and an allocation module configured to allocate a storage space of a corresponding fault tolerance level to the allocation request based on the fault tolerance requirement corresponding to the allocation request.

In a possible implementation, the feature of the allocation request is determined based on one or more of the following:
a size of the storage space corresponding to the allocation request, a frequency of accessing the storage space corresponding to the allocation request, and a location at which the storage space corresponding to the allocation request is invoked in a program.

In another possible implementation, determining, based on the feature of the allocation request, a fault tolerance requirement corresponding to the allocation request includes searching a pre-stored mapping table that stores a mapping relationship between a feature of an allocation request for a continuous storage space and a fault tolerance requirement, to determine the fault tolerance requirement corresponding to the allocation request.

In another possible implementation, the fault tolerance requirement corresponding to the allocation request is related to impact, on running of the target program, of a data loss of data that needs to be stored for the allocation request for a continuous storage space.

In another possible implementation, the fault tolerance requirement is related to a frequency of performing a write operation in a continuous storage space after corresponding data is stored into the continuous storage space for the allocation request, or the fault tolerance requirement is related to a frequency of performing a write operation in a continuous storage space after corresponding data is stored into the continuous storage space for a plurality of requests of a same type as the allocation request.

In another possible implementation, the impact on the running of the target program is related to the frequency of performing the write operation in the continuous storage space after the corresponding data is stored into the continuous storage space for the allocation request, or the impact on the running of the target program is related to the frequency of performing the write operation in the continuous storage space after the corresponding data is stored into the continuous storage space for the plurality of requests of the same type as the allocation request.

Therefore, the impact, on the running of the target program, of the data loss of the data may be determined based on the frequency of performing the write operation in the continuous storage space, and then the fault tolerance requirement of the allocation request is determined based on the impact, on the running of the target program, of the data loss of the data that needs to be stored for the allocation request for a continuous storage space.

In another possible implementation, the storage system is a memory of a computing device, the operating system is run on the computing device, and the storage spaces of the plurality of fault tolerance levels are memory spaces of the plurality of fault tolerance levels.

In another possible implementation, the allocation request carries a data segment related to the target program, and the data segment related to the target program includes code of the target program, data generated in a running process of the target program, or input data of the target program.

In another possible implementation, the storage spaces of different fault tolerance levels have different fault tolerance mechanisms, or the storage spaces of different fault tolerance levels have a same fault tolerance mechanism, but different fault tolerance levels.

According to a third aspect, the present disclosure provides a computing device, including a memory and a processor. The memory stores computer program instructions, and the processor runs the computer program instructions to implement the method according to the first aspect.

According to a fourth aspect, the present disclosure provides a computer-readable storage medium. The computer-readable storage medium stores a computer program, and when the computer program is executed by a processor, the method according to the first aspect is implemented.

According to a fifth aspect, the present disclosure provides a chip. The chip includes at least one processor and an interface, and the at least one processor determines program instructions or data through the interface. The at least one processor is configured to execute the program instructions to implement the method according to the first aspect.

According to a sixth aspect, the present disclosure provides a computer program or a computer program product. The computer program or the computer program product includes instructions. When the instructions are executed, a computer is enabled to perform the method according to the first aspect.

DESCRIPTION OF EMBODIMENTS

The technical solutions of this application are further described in detail below with reference to the accompanying drawings and embodiments.

Figure 1:
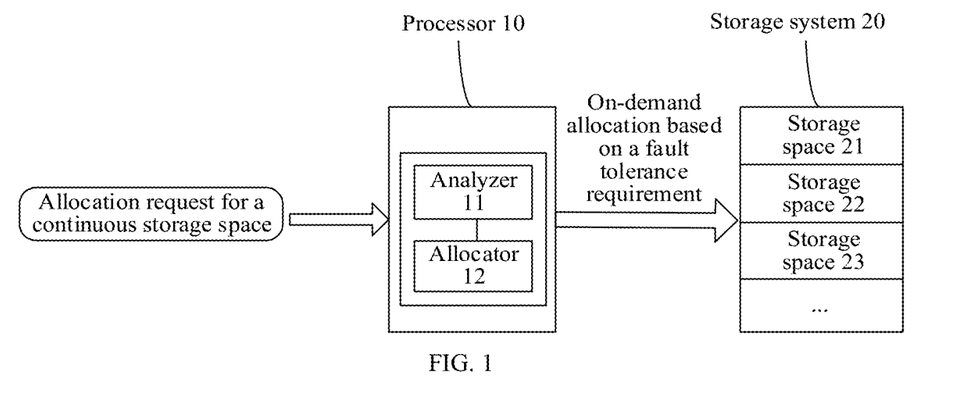
FIG. 1 is a schematic diagram of an architecture of a computing device according to an embodiment of the present disclosure.

FIG. 1 is a schematic diagram of an architecture of a computing device according to an embodiment of the present disclosure. As shown in FIG. 1, the computing device includes at least a processor 10 and a storage system 20. The storage system 20 includes storage spaces of a plurality of fault tolerance levels, for example, a storage space 21, a storage space 22, and a storage space 23. Storage spaces of different fault tolerance levels have different fault tolerance capabilities. For example, the storage space 21, the storage space 22, and the storage space 23 are respectively a storage space of a first fault tolerance level, a storage space of a second fault tolerance level, and a storage space of a third fault tolerance level. The storage space of the first fault tolerance level has a greatest fault tolerance capability, the storage space of the second fault tolerance level has a second greatest fault tolerance capability, and the storage space of the third fault tolerance level has a worst fault tolerance capability. The processor 10 runs a program of allocating a data storage space. The program includes at least an analyzer 11 and an allocator 12. The analyzer 11 is configured to analyze a fault tolerance requirement corresponding to one allocation request for a continuous storage space. The allocator 12 is configured to allocate a storage space of a corresponding fault tolerance level to the allocation request for a continuous storage space based on the fault tolerance requirement corresponding to the allocation request for a continuous storage space.

In a process of allocating the data storage space, after one allocation request of an operating system for a continuous storage space for a target program is detected, the analyzer 11 first performs fault tolerance requirement analysis on the allocation request, to determine the fault tolerance requirement corresponding to the allocation request. Then the allocator 12 allocates the storage space of the corresponding fault tolerance level to the allocation request based on the fault tolerance requirement corresponding to the allocation request. The analyzer 11 and the allocator 12 are, for example, program modules run in the processor.

For example, if the analyzer 11 determines, through analysis, that the fault tolerance requirement corresponding to the allocation request falls within a fault tolerance range of a fault tolerance capability of the second fault tolerance level, the allocator 12 allocates the storage space in the storage space 22 to the allocation request, to allocate a fault tolerance resource on demand, and avoid unnecessary performance costs and cost overheads caused by fault tolerance.

It should be noted that, as shown in FIG. 1, that the storage system has storage spaces of three different fault tolerance levels (for example, the storage space 21, the storage space 22, and the storage space 23) is merely an example. A quantity of storage spaces of different fault tolerance levels in the storage system may be configured based on an actual requirement. However, to allocate the fault tolerance resource on demand, the storage system has at least two storage spaces of different fault tolerance levels. For example, the storage system may have two storage spaces of different fault tolerance levels or four storage spaces of different fault tolerance levels. The quantity of storage spaces of different fault tolerance levels in the storage system is not limited in embodiments of the present disclosure, provided that the storage system has storage spaces of different fault tolerance levels.

In other words, the storage system includes at least two storage spaces of different fault tolerance levels, that is, the storage spaces in the storage system are divided into at least two storage spaces with different fault tolerance capabilities, to allocate fault tolerance resources on demand for allocation requests with different fault tolerance requirements. The three different fault tolerance levels, for example, all use an erasure coding (EC) technology for redundancy, and redundancy ratios are respectively 2:1, 3:1, and 4:1.

Figure 2:
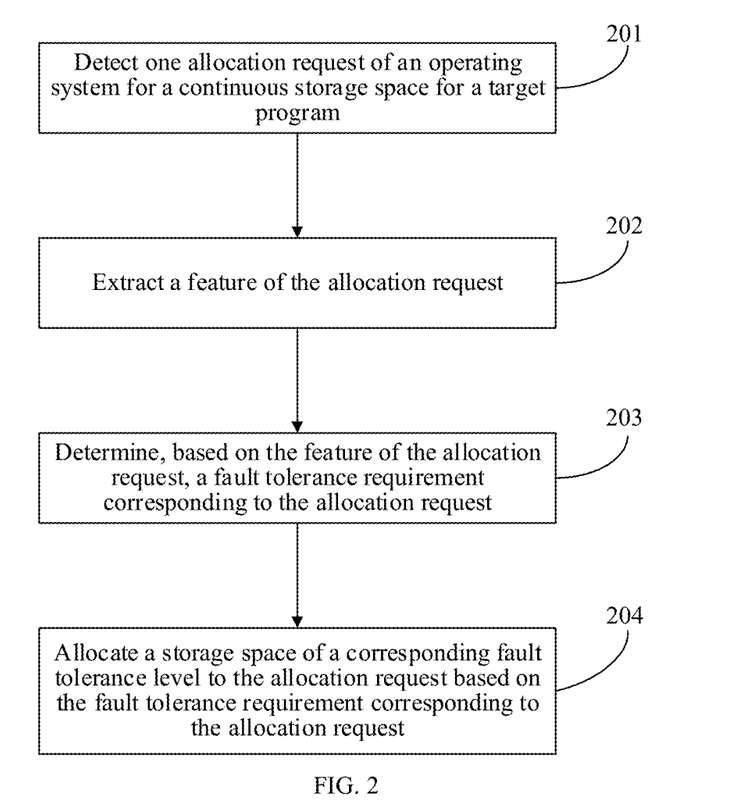
FIG. 2 is a flowchart of a method for allocating a data storage space according to an embodiment of the present disclosure.

FIG. 2 is a flowchart of a method for allocating a data storage space according to an embodiment of the present disclosure. The method is applied to the computing device shown in FIG. 1. As shown in FIG. 2, the method includes at least step 201 to step 204.

In step 201, one allocation request of an operating system for a continuous storage space for a target program is detected.

When the target program needs to incur storage overheads, the operating system generates an allocation request for a continuous storage space for the target program. For example, before the target program needs to be executed, a storage space allocation (or memory allocation (malloc)) function in a runtime library in the operating system generates one allocation request for a continuous storage space for the target program. In an execution process of the target program, the malloc function in the runtime library sends several allocation requests for continuous storage spaces for data segments of related data of the target program. Therefore, that one allocation request of the operating system for a continuous storage space for the target program may be used as a trigger condition of the method for allocating a storage space. When the allocation request of the operating system for a continuous storage space for the target program is detected, subsequent step 202 to step 204 are performed.

The allocation request carries the data segment related to the target program. The data segment related to the target program indicates data that incurs storage overheads in a running process of the target program. For example, the data segment related to the target program may include code of the target program (for example, source code or bytecode of the target program), data generated in the running process of the target program, or input data of the target program.

For example, when the input data needs to be invoked from an external memory to a memory for storage, the data segment related to the target program includes the code of the target program, the data generated in the running process of the target program, or the input data. When the input data does not need to be invoked from the external memory to the memory for storage, the data segment related to the target program is the code of the target program or the data generated in the running process of the target program.

The input data may be a plurality of types of data. For example, if the target program is an audio playing program, the input data is audio data, if the target program is a video playing program, the input data is video data, or if the target program is an image processing program, the input data is image data.

The data generated in the running process of the target program means data that is inevitably generated in the running process of the target program. The data also incurs memory overheads. For example, the data may include intermediate calculation result data, final calculation result data, and program state data that are generated by processing the input data.

In step 202, a feature of the allocation request is extracted.

Different allocation requests may have different features. For example, if a label of the allocation request is used as the feature of the allocation request, different requests have different labels. Alternatively, among a plurality of types of allocation requests, requests of a same type have a same feature, and the requests of the same type have a same requirement for a fault tolerance level of data.

For example, the feature of the allocation request for a continuous storage space for the target program is determined based on one or more of the following: a size of a storage space corresponding to the allocation request, a frequency of accessing the storage space corresponding to the allocation request, and a location at which the storage space corresponding to the allocation request is invoked in a program. "The allocation request for a continuous storage space" herein refers to a single allocation request (not a plurality of allocation requests), and the requested storage space is logically continuous (not discrete).

In step 203, a fault tolerance requirement corresponding to the allocation request is determined based on the feature of the allocation request.

After the feature of the allocation request is extracted, the fault tolerance requirement corresponding to the allocation request is determined based on the feature.

For example, the computing device pre-stores a mapping table of a mapping relationship between a feature of an allocation request for a continuous storage space and a fault tolerance requirement, and the fault tolerance requirement corresponding to the allocation request is determined by searching the mapping table.

In an example, the mapping relationship between the feature of the allocation request for a continuous storage space and the fault tolerance requirement may be determined based on a plurality of allocation requests for continuous storage spaces in a plurality of programs and memory vulnerability factors (MVFs) corresponding to the plurality of allocation requests for continuous storage spaces. The MVF corresponding to the allocation request for a continuous storage space represents a fault tolerance requirement corresponding to the allocation request for a continuous storage space.

For example, a plurality of programs is run in a simulator, statuses of accessing memory address spaces corresponding to the plurality of allocation requests for continuous storage spaces in running processes of the plurality of programs are analyzed, and frequencies of performing a write operation on the memory address spaces corresponding to the plurality of allocation requests for continuous storage spaces are counted, to determine the MVFs corresponding to the allocation requests.

To make it easier to understand an MVF value, an example is provided. It is assumed that when data corresponding to a request of a type A is lost, a running fault of a program is not caused, when data corresponding to a request of a type B is lost, a minor fault of the program is caused, and when data corresponding to a request of a type C is lost, a severe fault of the program is caused. In this case, MVF values of the three requests increase in sequence, that is, $MVF_A < MVF_B < MVF_C$.

It should be noted that a meaning of a data loss herein is a problem of data caused by a fault of storage hardware. The fault of the storage hardware includes but is not limited to a bit flipping error (that is, a value of a bit changes from 0 to 1, or changes from 1 to 0).

Then, a feature of each of the plurality of allocation requests for continuous storage spaces is extracted, and an MVF corresponding to each feature is recorded, to obtain the mapping relationship between the feature of the allocation request for a continuous storage space and the fault tolerance requirement, to determine the mapping table that stores the mapping relationship between the feature of the allocation request for a continuous storage space and the fault tolerance requirement.

The MVF means that for a storage address (or a storage address range), a possibility that an error that occurs on storage hardware corresponding to the address (or the range) is reflected as a program failure that is visible to a user (including but not limited to that the program generates a wrong result or throws an exception, or a system is suspended) is measured. The MVF value ranges from 0 to 1. A larger value indicates that a storage error is more likely to be reflected as the program failure that is visible to the user. In addition to the MVF value, certainly, there may be another measurement manner, provided that impact of a data loss on program running can be evaluated when data corresponding to the request for a continuous storage space is lost.

In an example, the program is run in the simulator, and the status of accessing the memory address space corresponding to each allocation request for a continuous storage space in the running process of the program is determined. An MVF corresponding to a virtual memory address of each allocation request for a continuous storage space is determined based on the status of accessing the memory address space corresponding to the allocation request for a continuous storage space.

For example, when the storage system is a memory system, life cycle analysis is performed on each bit of the memory system (including a cache, a translation lookaside buffer (TLB), a write cache, and the like). For each bit, the bit is marked as an "ACE" state or a "non-ACE" state in different clock cycles. If a bit is in a clock cycle in the ACE state, it means that a correct value of the bit is necessary to ensure ACE of load, for example, an abnormal value of the bit affects a final output result of the load. On the contrary, if a bit is in a clock cycle in the non-ACE state, it means that a value of the bit in the time interval does not affect the final result of the load.

In an initial cycle, all bits are marked as the ACE state "conservatively". In an example, by default, a change of a value of each bit causes a change that is visible to the user in the program. Then, a non-ACE interval of each bit is determined by identifying and analyzing a status of accessing each bit. The non-ACE interval needs to be determined by identifying the status of accessing the bit, or more further, depending on whether a write operation is performed on data on a target bit. If the data is written, it indicates that a memory bit flipping error on the bit is flushed and overwritten, so that the program failure that is visible to the user does not occur. Therefore, the bit should be marked as the non-ACE state in a time interval from a previous access operation to the current write operation.

Based on the foregoing analysis, an MVF of a specific memory area mr in N clock cycles may be calculated by using the following formula:

$$MVF_{mr} = \frac{\sum_{n=0}^{N} (\text{a quantity of ACE bits in } mr \text{ in a clock cycle } n)}{B_{mr} \times N}$$

$$= \frac{\sum_{b=0}^{B_{mr}} (\text{a total quantity of clock cycles in which } b \text{ is in an } ACE \text{ state})}{B_{mr} \times N}$$

$B_{mr}$ is a size of mr, that is, a total quantity of bits.

It can be learned from the foregoing formula that, to calculate $MVF_{mr}$, a total quantity of clock cycles in which bits of mr are in the ACE state needs to be calculated. Further, for a specific bit b, an operation performed on b needs to be continuously tracked in N inspection cycles to obtain an operation sequence, and the ACE state and the non-ACE state are classified based on the operation sequence.

Figure 3:
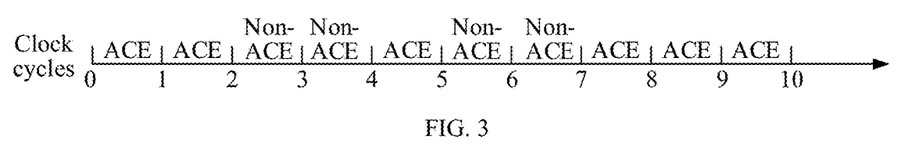
FIG. 3 is a schematic diagram of an architecturally correct execution (ACE) state of a specific bit b in 10 clock cycles.

For example, FIG. 3 shows the ACE state of the specific bit b in 10 clock cycles. The bit is in the ACE state in six clock cycles (for example, clock cycles 1, 2, 5, 8, 9, and 10 in FIG. 3), and are in the non-ACE state in four clock cycles (for example, clock cycles 3, 4, 6, and 7 in FIG. 3). In this case, an MVF of a memory space of the bit=6/10=0.6.

After an MVF of the memory address space corresponding to each allocation request for a continuous storage space is determined, an MVF of a virtual memory address corresponding to each bit of data is determined, and finally, the MVF of each allocation request for a continuous storage space is determined based on the MVF of the virtual memory address corresponding to each bit of data in each data segment.

There is a plurality of methods for determining the MVF of each allocation request for a continuous storage space based on the MVF of the virtual memory address corresponding to each bit of data in each data segment. For example, according to the buckets effect, to achieve an optimal fault tolerance capability, a maximum value of the MVF of the virtual memory address corresponding to each bit of data in each data segment may be selected as the MVF of each allocation request for a continuous storage space. Alternatively, in comprehensive consideration of costs and overheads and the fault tolerance capability, an average value of the MVF of the virtual memory address corresponding to each bit of data in each data segment is selected as the MVF of each allocation request for a continuous storage space. Alternatively, to minimize costs and overheads, a minimum value of the MVF of the virtual memory address corresponding to each bit of data in each data segment is selected as the MVF of each allocation request for a continuous storage space. During actual application, an appropriate method for determining the MVF of each allocation request for a continuous storage space based on the MVF of the virtual memory address corresponding to each bit of data in each data segment may be used based on an actual requirement.

It should be noted that an MVF aims to analyze error sensitivity of "data (including code)" in the storage system (such as the memory system) to help the system identify vulnerable data to protect the vulnerable data. Therefore, analysis of the MVF should help track a life cycle and an activity trace of specific data at each layer of the memory. Technically, an analyzer is required to identify a virtual address of related data of the target program (for example, a memory address range allocated through the malloc function) at an application layer, convert the virtual address into a physical address, and use the physical address as a target to analyze and calculate an MVF of the related data at each layer of the memory.

In another example, a method for performing static analysis on the target program may alternatively be used to determine the fault tolerance requirement corresponding to the feature of each allocation request for a continuous storage space for the target program, that is, to determine the MVF corresponding to the feature of each allocation request for a continuous storage space for the target program.

In another example, the fault tolerance requirement corresponding to each allocation request for a continuous storage space for the target program may alternatively be determined based on one or more of the following: the MVF, importance, and recovery difficulty corresponding to each allocation request for a continuous storage space. For example, the fault tolerance requirement of each allocation request for a continuous storage space may be determined based on the MVF of each allocation request for a continuous storage space, or determined based on the importance of each allocation request for a continuous storage space, or determined based on the recovery difficulty of each allocation request for a continuous storage space, or determined based on the MVF and the importance of each allocation request for a continuous storage space, or determined based on the MVF and the recovery difficulty of each allocation request for a continuous storage space, or determined based on the importance and the recovery difficulty of each allocation request for a continuous storage space, or determined based on the MVF, the importance, and the recovery difficulty of each allocation request for a continuous storage space.

When the fault tolerance requirement of each allocation request for a continuous storage space is determined based on two or three of the MVF, the importance, and the recovery difficulty of each data segment, weights of the MVF, the importance, and the recovery difficulty of each allocation request for a continuous storage space may be respectively set based on a requirement. After the MVF, the importance, and the recovery difficulty of each allocation request for a continuous storage space are analyzed, the fault tolerance requirement of each allocation request for a continuous storage space is measured by using a weighted average of the MVF, the importance, and the recovery difficulty of each allocation request for a continuous storage space. Alternatively, according to the buckets effect, a maximum value of the MVF, the importance, and the recovery difficulty of each allocation request for a continuous storage space is taken to determine the fault tolerance requirement of each allocation request for a continuous storage space.

When the fault tolerance requirement of each allocation request for a continuous storage space is determined based on one of the MVF, the importance, and the recovery difficulty of each data segment, the MVF of each allocation request for a continuous storage space, the importance of each allocation request for a continuous storage space, or the recovery difficulty of each allocation request for a continuous storage space directly determines the fault tolerance requirement of each allocation request for a continuous storage space. In an example, a larger value of the MVF, the importance, or the recovery difficulty of each allocation request for a continuous storage space indicates a higher requirement for the fault tolerance capability of the storage space.

The importance and the recovery difficulty of each allocation request for a continuous storage space may be obtained through analysis based on an analysis method in other approaches. For brevity, details are not described in this embodiment of the present disclosure.

In step 204, a storage space of a corresponding fault tolerance level is allocated to the allocation request based on the fault tolerance requirement corresponding to the allocation request.

To enable a storage allocator to allocate storage spaces of corresponding fault tolerance levels to allocation requests for continuous storage spaces with different fault tolerance requirements, the operating system needs to provide an interface for the storage allocator, so that the storage allocator has a capability of specifying a storage space of a specific fault tolerance level when allocating the storage space.

The storage allocator allocates the storage space of the corresponding fault tolerance level to the allocation request based on the fault tolerance requirement of the allocation request, and then stores, into the allocated storage space of the corresponding fault tolerance level, the data segment related to the target program and carried in the allocation request.

In an example, the fault tolerance requirement of the allocation request is directly determined based on the MVF of the allocation request. For example, the fault tolerance requirement of the allocation request is measured by using 0 to 1. A larger value indicates a higher requirement for the fault tolerance capability, and an MVF value of the allocation request is equal to a value of the fault tolerance requirement of the allocation request.

Different preset intervals may be set for storage spaces of different fault tolerance levels. For example, a first preset interval (for example, 0.8 to 1) corresponds to a storage space of a first fault tolerance level with a highest fault tolerance capability, a second preset interval (for example, 0.4 to 0.8) corresponds to a storage space of a second fault tolerance level with a second highest fault tolerance capability, and a third preset interval (for example, 0 to 0.4) corresponds to a storage space of a third fault tolerance level with a worst fault tolerance capability. When an MVF value of an allocation request falls within the first preset interval (for example, 0.8 to 1), a storage space is allocated to the allocation request in the storage space of the first fault tolerance level. When an MVF value of an allocation request falls within the second preset interval (for example, 0.4 to 0.8), a storage space is allocated to the allocation request in the storage space of the second fault tolerance level. When an MVF value of an allocation request falls within the third preset interval (for example, 0 to 0.4), a storage space is allocated to the allocation request in the storage space of the third fault tolerance level.

In other words, the storage allocator in this embodiment of the present disclosure can allocate a storage space with a corresponding fault tolerance capability to the allocation request based on the MVF value of the allocation request, and the storage allocator may be referred to as an MVF-aware memory allocator (MMA).

In an example, the storage space of the first fault tolerance level with the highest fault tolerance capability may use a three-way mirroring fault tolerance mechanism. In an example, 1:2 redundancy is required for the storage space, and two-thirds of the storage space is used for mirroring for fault tolerance, to ensure that the storage space has a very high fault tolerance capability. The storage space of the second fault tolerance level may use a two-way mirroring fault tolerance mechanism. In an example, 1:1 redundancy is required for the storage space, and half of the storage space is used for mirroring for fault tolerance, to ensure that the storage space has a high fault tolerance capability. The storage space of the third fault tolerance level may use an on-die ECC fault tolerance mechanism. In an example, an 8-bit ECC is additionally added to 64-bit data, to implement a fault tolerance capability of SECDEC, that is, single-bit error correction and double-bit error detection for the 64-bit data, so that the storage space has a specific fault tolerance capability.

In another example, the storage spaces of different fault tolerance levels may alternatively use a same fault tolerance mechanism, but different fault tolerance configurations, to implement different fault tolerance capabilities. For example, the storage space of the first fault tolerance level, the storage space of the second fault tolerance level, and the storage space of the third fault tolerance level all use the on-die ECC fault tolerance mechanism, but fault tolerance redundancy configured in on-die ECCs of storage spaces of different fault tolerance levels is different. For example, in an on-die ECC of the storage space of the first fault tolerance level, a 32-bit ECC is additionally added to 64-bit data to implement a fault tolerance capability of SECDEC, that is, SECDEC for the 64-bit data. In an on-die ECC of the storage space of the second fault tolerance level, a 16-bit ECC is additionally added to 64-bit data to implement a fault tolerance capability of SECDEC, that is, SECDEC for the 64-bit data. In an on-die ECC of the storage space of the third fault tolerance level, an 8-bit ECC is additionally added to 64-bit data to implement a fault tolerance capability of SECDEC, that is, SECDEC for the 64-bit data.

Figure 4:
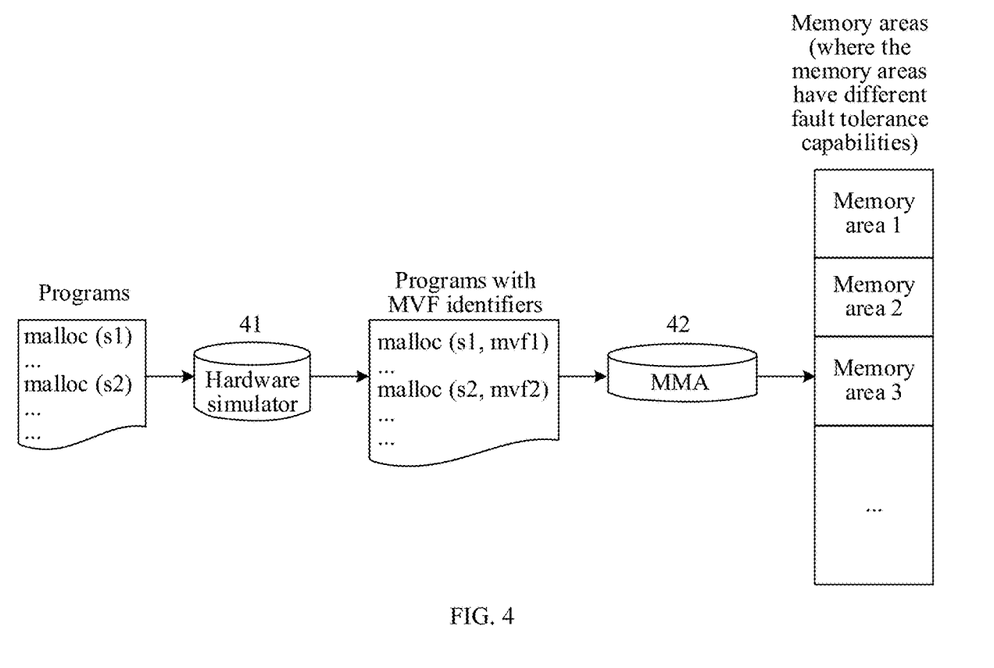
FIG. 4 is a schematic diagram of an architecture of allocating a storage space of a computing device according to an embodiment of the present disclosure.

During actual application, based on the foregoing method for allocating a data storage space, the computing device may have two different architectures of allocating storage spaces. FIG. 4 shows an architecture of allocating a storage space of a computing device. As shown in FIG. 4, a hardware simulator 41 may implement evaluation and analysis of an MVF of an allocation request, and an MMA 42 may allocate a memory area of a corresponding fault tolerance level to the allocation request based on the MVF of the allocation request, to implement fault tolerance on demand. As shown in FIG. 4, a memory system includes memory areas with different fault tolerance capabilities. When a program is run in the memory system, the hardware simulator 41 can analyze and calculate an MVF corresponding to each memory address (or address range) required by the program. Then the MMA 42 performs memory allocation based on an MVF evaluation result, and allocates memory data with high (or low) error sensitivity to a memory area of high (or low) fault tolerance strength. Further, in FIG. 4, a data memory space dynamically allocated through a malloc function is used as an example. The hardware simulator 41 can analyze an MVF of an address range corresponding to each malloc function. Then the MMA selects, based on the MVF, a memory area of a corresponding fault tolerance level to complete memory allocation for each malloc function, to ensure that a high MVF matches high fault tolerance strength. It should be noted that, although the data memory space dynamically allocated through the malloc function is used as an example in FIG. 4, a scenario to which the computing device in this embodiment of the present disclosure is applicable is not limited thereto, but may be extended to a data memory space and a code memory space that are allocated in any other manner. In addition, a "program with an MVF identifier" output by the hardware simulator 41 in FIG. 4 is also merely an example. Actually, implementation of this embodiment of the present disclosure does not depend on "explicitly" binding the evaluated MVF to source code as an output, instead, the evaluated MVF only needs to be associated with a corresponding memory area or memory allocation function by using an appropriate technical means.

The computing device provided in this embodiment of the present disclosure can evaluate the MVF corresponding to each memory address (or address range) required by the program, then perform memory allocation based on the MVF evaluation result, and allocate the memory data with the high (or low) error sensitivity to the memory area of the high (or low) fault tolerance strength.

Compared with a common fault tolerance technology based on a design of static consistency, the storage space allocation solution provided in this embodiment of the present disclosure can implement dynamic allocation of a fault tolerance resource on demand based on an error risk degree of the program.

Compared with an ACE analysis method, in the MVF evaluation method in the storage space allocation solution provided in this embodiment of the present disclosure, impact of software and hardware on a memory error risk instead of only impact of the hardware can be comprehensively considered.

Figure 5:
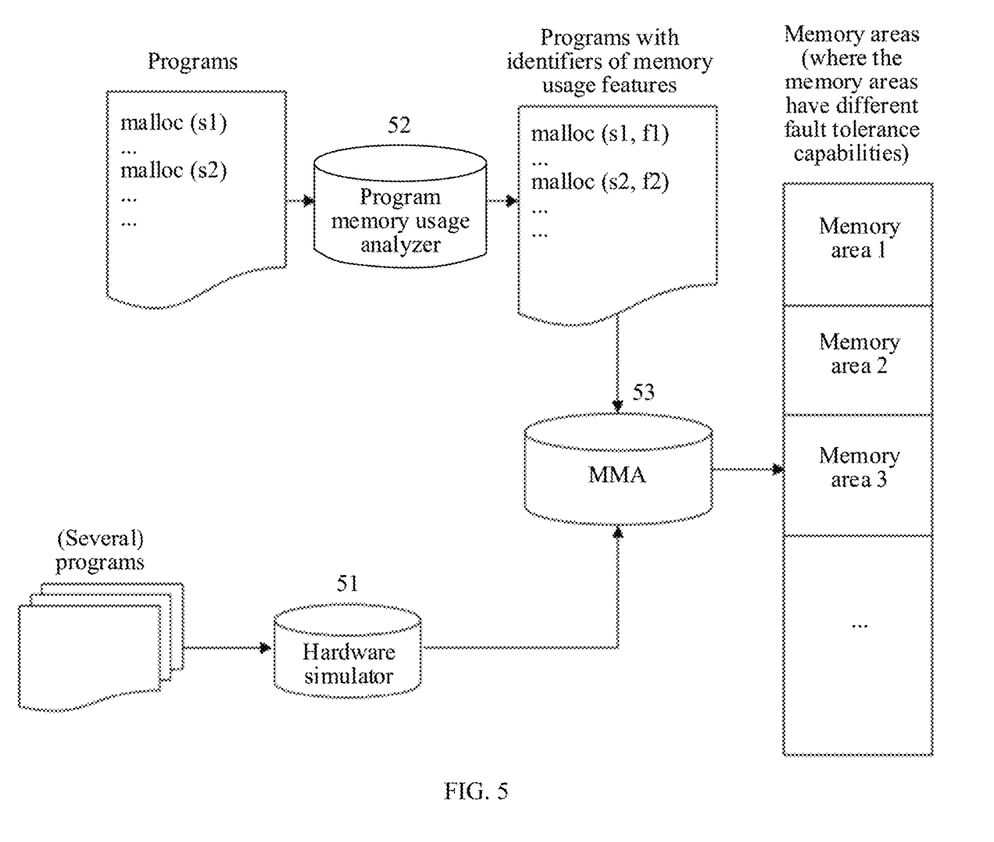
FIG. 5 is a schematic diagram of another architecture of allocating a storage space of a computing device according to an embodiment of the present disclosure.

FIG. 5 shows another architecture of allocating a storage space of a computing device. The computing device in the architecture of allocating a storage space supports a complex MVF evaluation scenario. A memory system includes memory areas with different fault tolerance capabilities. MVF evaluation is completed by two parts: extraction (implemented by a hardware simulator 51 in FIG. 5) of a mapping table F-MVF Map between a memory usage feature of a program that is implemented based on a hardware simulation technology and an MVF, and extraction (implemented by a program memory usage analyzer 52 in FIG. 5) of a memory usage feature of the program that is implemented based on a program analysis technology. The hardware simulator 51 first evaluates MVFs of a large quantity of typical program memory addresses to determine the mapping table F-MVF Map between the memory usage feature of the program and the MVF. Then, the program memory usage analyzer 52 extracts the memory usage feature of the program by using the program analysis technology, and associates the feature with each memory address (range) or memory allocation function (a malloc function shown in FIG. 5). Finally, a MMA 53 searches F-MVF Map extracted by the hardware simulator to obtain a corresponding MVF for a memory usage feature of each memory address (range) or memory allocation function, and then selects a memory area of a corresponding fault tolerance level based on the MVF to complete memory allocation.

Same as the computing device in the previous architecture of allocating a storage space, the computing device in the current architecture of allocating a storage space can evaluate the MVF corresponding to each memory address (or address range) required by the program, then perform memory allocation based on an MVF evaluation result, and allocate memory data with high (or low) error sensitivity to a memory area of high (or low) fault tolerance strength.

Compared with the computing device in the previous architecture of allocating a storage space, a main improvement of the computing device in the current architecture of allocating a storage space lies in that the computing device in the previous architecture of allocating a storage space has a problem of high time overheads of simulating a complex application program, which limits practicability of the computing device in a real production environment. Therefore, the computing device in the current architecture of allocating a storage space is extended by adding a compilation analysis technology. An application feature that affects the MVF is extracted by analyzing a large quantity of programs offline, to allow the feature to be quickly mapped by using F-MVF Map to obtain the MVF.

Based on a same concept as the foregoing method embodiment, an embodiment of the present disclosure further provides an apparatus 600 for allocating a data storage space. The apparatus 600 for allocating a data storage space includes units or means for implementing the steps performed by the processor of the computing device in the method for allocating a data storage space shown in FIG. 2.

Figure 6:
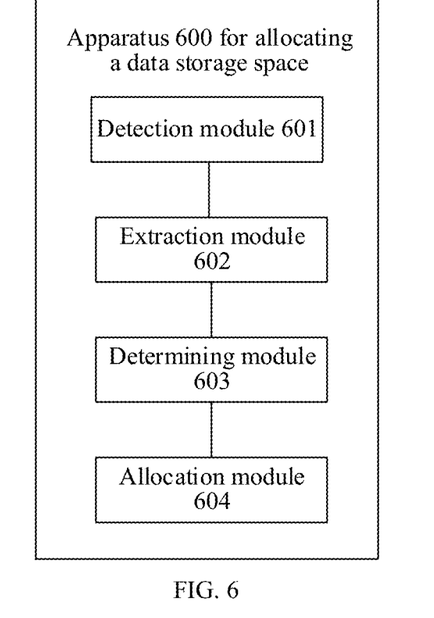
FIG. 6 is a schematic diagram of a structure of an apparatus for allocating a data storage space according to an embodiment of the present disclosure.

FIG. 6 is a schematic diagram of a structure of an apparatus for allocating a data storage space according to an embodiment of the present disclosure. The apparatus is used in a computing device. The computing device includes a storage system. The storage system provides storage spaces of a plurality of fault tolerance levels, and storage spaces of different fault tolerance levels have different fault tolerance capabilities. As shown in FIG. 6, the apparatus 600 for allocating a data storage space includes at least a detection module 601 configured to detect one allocation request of an operating system for a continuous storage space for a target program, an extraction module 602 configured to extract a feature of the allocation request, a determining module 603 configured to determine, based on the feature of the allocation request, a fault tolerance requirement corresponding to the allocation request, and an allocation module 604 configured to allocate a storage space of a corresponding fault tolerance level to the allocation request based on the fault tolerance requirement corresponding to the allocation request.

In a possible implementation, the feature of the allocation request is determined based on one or more of the following: a size of the storage space corresponding to the allocation request, a frequency of accessing the storage space corresponding to the allocation request, and a location at which the storage space corresponding to the allocation request is invoked in a program.

In a possible implementation, determining, based on the feature of the allocation request, a fault tolerance requirement corresponding to the allocation request includes searching a pre-stored mapping table that stores a mapping relationship between a feature of an allocation request for a continuous storage space and a fault tolerance requirement, to determine the fault tolerance requirement corresponding to the allocation request.

In a possible implementation, the fault tolerance requirement corresponding to the allocation request is related to impact, on running of the target program, of a data loss of data that needs to be stored for the allocation request for a continuous storage space.

In another possible implementation, the fault tolerance requirement is related to a frequency of performing a write operation in a continuous storage space after corresponding data is stored into the continuous storage space for the allocation request, or the fault tolerance requirement is related to a frequency of performing a write operation in a continuous storage space after corresponding data is stored into the continuous storage space for a plurality of requests of a same type as the allocation request.

In another possible implementation, the storage system is a memory of a computing device, the operating system is run on the computing device, and the storage spaces of the plurality of fault tolerance levels are memory spaces of the plurality of fault tolerance levels.

In another possible implementation, the allocation request carries a data segment related to the target program, and the data segment related to the target program includes code of the target program, data generated in a running process of the target program, or input data of the target program.

In another possible implementation, the storage spaces of different fault tolerance levels have different fault tolerance mechanisms, or the storage spaces of different fault tolerance levels have a same fault tolerance mechanism, but different fault tolerance levels.

The apparatus 600 for allocating a data storage space according to this embodiment of the present disclosure may correspondingly perform the method described in embodiments of the present disclosure. In addition, the foregoing and other operations and/or functions of the modules in the apparatus 600 for allocating a data storage space are separately used to implement corresponding procedures of the method in FIG. 2. For brevity, details are not described herein again.

An embodiment of the present disclosure further provides a computing device, including at least one processor, a memory, and a communication interface. The processor is configured to perform the method in FIG. 2.

Figure 7:
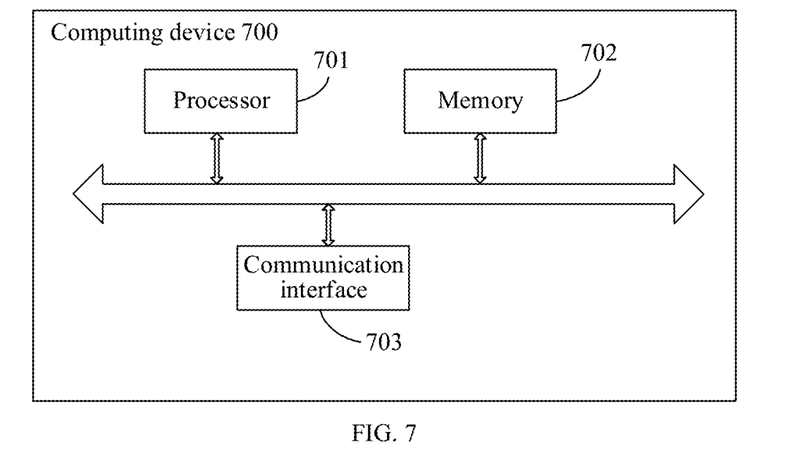
FIG. 7 is a schematic diagram of a structure of a computing device according to an embodiment of the present disclosure.

FIG. 7 is a schematic diagram of a structure of a computing device according to an embodiment of the present disclosure.

As shown in FIG. 7, the computing device 700 includes at least one processor 701, a memory 702, and a communication interface 703. The processor 701 is communicatively connected to the memory 702 and the communication interface 703, or may implement communication by using another means such as wireless transmission. The communication interface 703 is configured to receive external data (for example, related data of a target program). The memory 702 stores computer instructions. The processor 701 executes the computer instructions to perform the method for allocating a data storage space in the foregoing method embodiment. The computing device 700 is, for example, a personal computer, a general-purpose server, a storage server, a dedicated storage device, or another device similar to a computer and having a processor, a storage system (for example, a memory), or an input/output system.

It should be understood that, in this embodiment of the present disclosure, the processor 701 may be a central processing unit (CPU), or the processor 701 may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, another processor, or the like.

The memory 702 may include a read-only memory (ROM) and a RAM, and provide instructions and data to the processor 701. The memory 702 may further include a nonvolatile random access memory.

The memory 702 may be a volatile memory. The volatile memory may be a RAM, and is used as an external cache. Through examples but not limitative descriptions, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchronous-link (synchlink) DRAM (SLDRAM), and a direct Rambus (DR) RAM.

A storage system that provides storage spaces of a plurality of fault tolerance levels may be the memory 702 or a hard disk of a computer system.

It should be understood that the computing device 700 according to this embodiment of the present disclosure may perform and implement the method shown in FIG. 2 in embodiments of the present disclosure. For detailed descriptions of implementation of the method, refer to the foregoing descriptions. For brevity, details are not described herein again.

An embodiment of the present disclosure provides a computer-readable storage medium. The computer-readable storage medium stores a computer program, and when the computer instructions are executed by a processor, the method for allocating a data storage space mentioned above is implemented.

An embodiment of the present disclosure provides a chip. The chip includes at least one processor and an interface. The at least one processor determines program instructions or data through the interface. The at least one processor is configured to execute the program instructions, to implement the method for allocating a data storage space mentioned above.

An embodiment of the present disclosure provides a computer program or a computer program product. The computer program or the computer program product includes instructions. When the instructions are executed, a computer is enabled to perform the method for allocating a data storage space mentioned above.

A person of ordinary skill in the art should be aware that units and algorithm steps in the examples described with reference to embodiments disclosed in this specification can be implemented by electronic hardware, computer software, or a combination of the computer software and the electronic hardware. To clearly describe interchangeability of hardware and software, various illustrative components and steps have been described above generally in terms of functions. Whether these functions are performed by hardware or software depends on a particular application and a design constraint of the technical solutions. A person of ordinary skill in the art may use different methods to implement the described functions for each particular application, but it should not be considered that the implementation goes beyond the scope of this application.

The steps of the methods or algorithms described in embodiments disclosed in this specification may be implemented by hardware and a software module executed by the processor or a combination of the hardware and the software module executed by the processor. The software module may be configured in a RAM, a memory, a ROM, an erasable programmable ROM (EPROM), an electrically erasable PROM (EEPROM), a register, a hard disk, a removable disk, a compact disc (CD) ROM (CD-ROM), or a storage medium in any other forms well-known in the art.

In the foregoing implementations, the objective, the technical solutions, and beneficial effects of this application are further described in detail. It should be understood that the foregoing descriptions are merely example implementations of this application, and are not intended to limit the protection scope of this application. Any modification, equivalent replacement, or improvement made without departing from the spirit and principle of this application should fall within the protection scope of this application.

What is claimed is:

1. A computing device comprising:
   a memory configured to store instructions; and
   at least one processor coupled to the memory and configured to execute the instructions to cause the computing device to:
      detect an allocation request of an operating system for a first continuous storage space for a target program;
      extract a feature of the allocation request;
      determine, based on the feature of the allocation request, a fault tolerance requirement corresponding to the allocation request, wherein the fault tolerance requirement is related to:
         a first frequency of performing a first write operation in a second continuous storage space after first corresponding data is stored into the second continuous storage space for the allocation request; or
         a second frequency of performing a second write operation in a third continuous storage space after second corresponding data is stored into the third continuous storage space for requests of a same type as the allocation request; and
      allocate, based on the fault tolerance requirement, a storage space of a corresponding fault tolerance level to the allocation request.

2. The computing device of claim 1, wherein the at least one processor is further configured to execute the instructions to cause the computing device to extract the feature based on one or more of:
   a size of the storage space;
   a frequency of accessing the storage space; or
   a location at which the storage space is invoked in a program.

3. The computing device of claim 1, wherein the at least one processor is further configured to execute the instructions to cause the computing device to search a pre-stored mapping table that stores a mapping relationship between the feature and the fault tolerance requirement to determine the fault tolerance requirement.

4. The computing device of claim 1, wherein the fault tolerance requirement is related to impact, on running of the target program, of a data loss of data that is to be stored for the allocation request for the first continuous storage space.

5. The computing device of claim 1, wherein the operating system is configured to run on the computing device, wherein the memory is further configured to provide first storage spaces of first fault tolerance levels, wherein second storage spaces of different first fault tolerance levels have different fault tolerance capabilities, and wherein the first storage spaces are memory spaces of the first fault tolerance levels.

6. The computing device of claim 1, wherein the allocation request carries a data segment related to the target program, and wherein the data segment is:
   a code of the target program;
   data generated in a running process of the target program; or
   input data of the target program.

7. The computing device of claim 1, wherein the memory is further configured to provide first storage spaces of first fault tolerance levels, wherein second storage spaces of different first fault tolerance levels have different fault tolerance mechanisms or a same fault tolerance mechanism and the different first fault tolerance levels.

8. A method for allocating a data storage space and comprising:
   detecting an allocation request of an operating system for a first continuous storage space for a target program;
   extracting a feature of the allocation request;
   determining a fault tolerance requirement corresponding to the allocation request by searching a pre-stored mapping table that stores a mapping relationship between the feature and the fault tolerance requirement, wherein the fault tolerance requirement is related to:
      a first frequency of performing a first write operation in a second continuous storage space after first corresponding data is stored into the second continuous storage space for the allocation request; or
      a second frequency of performing a second write operation in a third continuous storage space after second corresponding data is stored into the third continuous storage space for requests of a same type as the allocation request; and
   allocating, based on the fault tolerance requirement, a storage space of a corresponding fault tolerance level to the allocation request.

9. The method of claim 8, wherein extracting the feature is based on one or more of:
   a size of the storage space;
   a frequency of accessing the storage space; or
   a location at which the storage space is invoked in a program.

10. The method of claim 8, wherein the fault tolerance requirement is related to an impact, on running of the target program, of a data loss of data that is to be stored for the allocation request for the first continuous storage space.

11. The method of claim 8, wherein the storage space is a memory of a computing device, wherein the method further comprises running an operating system on the computing device, and wherein first storage spaces of first fault tolerance levels of a plurality of fault tolerance levels of the memory are memory spaces of the first fault tolerance levels.

12. The method of claim 8, wherein the allocation request carries a data segment related to the target program, and wherein the data segment is:
   a code of the target program;
   data generated in a running process of the target program; or
   input data of the target program.

13. The method of claim 8, wherein the storage space is a memory of a computing device, wherein second storage spaces of different first fault tolerance levels of a plurality of fault tolerance levels of the memory have different fault tolerance mechanisms or have a same fault tolerance mechanism and the different first fault tolerance levels.

14. A computer program product comprising computer-executable instructions that are stored on a non-transitory computer-readable storage medium and that, when executed by at least one processor, cause a computing device to:
  detect an allocation request of an operating system for a continuous storage space for a target program;
  extract a feature of the allocation request;
  determine a fault tolerance requirement corresponding to the allocation request by searching a pre-stored mapping table that stores a mapping relationship between the feature and the fault tolerance requirement to determine the fault tolerance requirement, wherein the fault tolerance requirement is related to:
    a first frequency of performing a first write operation in a second continuous storage space after first corresponding data is stored into the second continuous storage space for the allocation request; or
    a second frequency of performing a second write operation in a third continuous storage space after second corresponding data is stored into the third continuous storage space for requests of a same type as the allocation request; and
  allocate, based on the fault tolerance requirement, a storage space of a corresponding fault tolerance level to the allocation request.

15. The computer program product of claim 14, wherein when executed by the at least one processor, the computer-executable instructions further cause the computing device to extract the feature based on one or more of:
  a size of the storage space;
  a frequency of accessing the storage space; or
  a location at which the storage space is invoked in a program.

16. The computer program product of claim 14, wherein the fault tolerance requirement is related to impact, on running of the target program, of a data loss of data that is to be stored for the allocation request for the continuous storage space.

17. The computer program product of claim 14, wherein the storage space is a memory of the computing device, wherein the memory comprises first storage spaces of first fault tolerance levels of a plurality of fault tolerance levels, wherein when executed by the at least one processor, the computer-executable instructions further cause the computing device to run the operating system on the computing device, and wherein the first storage spaces of the first fault tolerance levels are memory spaces of the first fault tolerance levels.

18. The computer program product of claim 14, wherein the allocation request carries a data segment related to the target program, and wherein the data segment is:
  a code of the target program;
  data generated in a running process of the target program; or
  input data of the target program.

19. The computer program product of claim 14, wherein the storage space is a memory of a computing device, wherein second storage spaces of different first fault tolerance levels of a plurality of fault tolerance levels of the memory have different fault tolerance mechanisms or have a same fault tolerance mechanism and the different first fault tolerance levels.

* * * * *